Patented Nov. 19, 1929

1,736,051

UNITED STATES PATENT OFFICE

ARTHUR B. RAY, OF FLUSHING, NEW YORK, ASSIGNOR TO CARBIDE AND CARBON CHEMICALS CORPORATION, A CORPORATION OF NEW YORK

PROCESS OF PREPARING ABSORPTIVE CARBON

No Drawing.   Application filed October 28, 1921. Serial No. 511,170.

This invention relates to a process for preparing rigid, coherent masses of highly absorbent carbonaceous material in which fragmentary carbonaceous material is first formed into shaped bodies and then activated, without disintegration into fragmentary form.

A preferred method of forming the absorbent mass is first to mix the fragments of absorbent material with a substance capable of giving a coherent and adherent carbonaceous residue on decomposition, and then to decompose the substance so that its carbonaceous residue will firmly bind together the absorbent fragments. These fragments may be ordinary charcoal, but where a high degree of absorptive power is desired, activated carbon should be used. It is known that most organic substances leave a carbonaceous residue on thermal decomposition, and any one of a number of such substances may be used to produce the bonding carbon. To secure a proper distribution of the bonding agent, it is desirable that the carbonaceous material should be in liquid state at some time before it is fully decomposed. This is accomplished by using a solution, or by using a fusible decomposable substance. Of course, a fusible substance in solution may be used.

As organic compounds for producing the bonding carbon, carbohydrates have many advantages. These substances usually fuse before or during thermal decomposition and are generally quite soluble in water. Sugars, especially the cheap and very soluble sugars, are satisfactory carbohydrates.

When charcoal is used as the fragmentary material, any grade of reasonable porosity may be selected and bonded with a carbonaceous material of the type above indicated.

For uses in which a high degree of coherence and mechanical strength are required, the absorptive fragmentary material may be molded under pressure. One use of this kind is in the preparation of porous masses for use in the filtration and purification of liquids.

The following process for preparing blocks of absorptive carbon for water filtering or the like is given by way of illustration: Absorptive carbon, preferably activated carbon of fairly high porosity, is pulverized to pass a 35 mesh screen and stay on a 100 mesh screen. The pulverized material is mixed thoroughly with 2 to 3 parts by weight of commercial glucose and is molded, under a pressure of about 10,000 lbs. per square inch, into blocks of suitable size. The molded blocks are subjected to heat, which is preferably regulated so as to rise at the rate of about 40° C. per hour to 450°–500° C., and the blocks are baked at this final temperature for about six hours. The resulting block of bonded activated carbon is strong and has a relatively high absorptive and adsorptive capacity. The pressure may be varied widely according to the particular degree of hardness and strength required in the molded bodies.

According to a modification of the process heretofore described, charcoal of relatively low absorptive capacity is bonded into a coherent mass and then activated without disintegration. Charcoal in fragmentary form, for example, may be agglomerated with a carbonaceous binder and subjected to the action of steam for about a half hour at a temperature of 700°–900° C. The absorptive capacity of the charcoal is materially increased by this treatment without substantially diminishing the coherence and rigidity of the mass. The activity of the carbon in the pressure molded blocks above referred to may be increased by subjecting them to steam under the conditions specified, if desired. Carbon dioxid, mixtures of carbon dioxid and steam, or other suitable oxidizing agents, may be used instead of steam.

I claim:

1. A process of forming strongly coherent bodies from highly absorptive carbonaceous material, without substantially impairing the absorptive capacity of the same, comprising associating such material in fragmentary condition with a substance yielding carbon on thermal decomposition, molding the resulting mixture under pressure, applying regulated heat to decompose said substance, and treating the coherent body thus formed with a gaseous oxidizing agent to increase its absorptive capacity.

2. A process of forming strongly coherent masses of activated carbon which comprises associating such carbon with a carbon-yielding substance, molding the resulting mixture under pressure, raising the temperature by successive stages to a point above that at which said carbon-yielding substance decomposes, and treating the coherent body thus formed with a gaseous oxidizing agent to increase its absorptive capacity.

3. A method of forming absorptive carbonaceous bodies which comprises bonding fragmentary charcoal to produce a block of regular shape, and treating said block with a hot oxidizing gas to increase its absorptivity.

In testimony whereof, I affix my signature.

ARTHUR B. RAY.